(12) United States Patent
Hendriks

(10) Patent No.: US 7,522,507 B2
(45) Date of Patent: Apr. 21, 2009

(54) OPTICAL SCANNING DEVICE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 538 days.

(21) Appl. No.: 10/549,589

(22) PCT Filed: Mar. 17, 2004

(86) PCT No.: PCT/IB2004/050276

§ 371 (c)(1),
(2), (4) Date: Sep. 19, 2005

(87) PCT Pub. No.: WO2004/084188

PCT Pub. Date: Sep. 30, 2004

(65) Prior Publication Data

US 2007/0035793 A1    Feb. 15, 2007

(30) Foreign Application Priority Data

Mar. 20, 2003    (EP) .................................. 03100719

(51) Int. Cl.
  *G11B 7/00* (2006.01)
(52) U.S. Cl. .............................. 369/112.01; 369/112.02
(58) Field of Classification Search ........................ None
  See application file for complete search history.

(56) References Cited

U.S. PATENT DOCUMENTS 6,064,529 A   5/2000   McDonald et al.

(Continued)

FOREIGN PATENT DOCUMENTS

EP        02075649         2/2002

(Continued)

OTHER PUBLICATIONS

Patent Abstracts of Japan, vol. 2002, No. 03, Apr. 3, 2002 -& JP 2001 307370 A (Olympus Optical Co Ltd), Nov. 2, 2001 abstract, paragraph '0001, paragraph '0021-paragraph '0060, figures 1,3.

(Continued)

*Primary Examiner*—Wayne R Young
*Assistant Examiner*—Lixi Chow

(57) ABSTRACT

An optical scanning device for scanning a multi-layer optical record carrier when positioned in a scanning location in the device, the device being adapted for scanning a first information layer at a first information layer depth within the record carrier and a second information layer at a second information layer depth within the record carrier. The device comprises: a radiation source for generating a radiation beam; an objective lens, located in an optical path between the radiation source and the scanning location, for converging a radiation beam to a spot on an information layer; and an optical switching arrangement switchable between a first state, in which the device is arranged to scan a said first information layer, and a second state, in which the device is arranged to scan a said second information layer. The optical switching arrangement comprises a compensator arranged to generate a different amount of spherical aberration in a radiation beam when in said first state and when in said second state. The compensator is further arranged to generate a different amount of vergence in a radiation beam when in said first state and when in said second state. The different amounts of spherical aberration and vergence are selected such that a free working distance between said objective lens and said optical record carrier remains substantially constant when switching between said first and second states.

15 Claims, 2 Drawing Sheets

U.S. PATENT DOCUMENTS

| | | |
|---|---|---|
| 6,510,011 B2 | 1/2003 | Hendriks et al. |
| 6,992,966 B2 * | 1/2006 | Yamamoto et al. ..... 369/112.02 |
| 7,050,214 B2 * | 5/2006 | Hain et al. ................. 359/254 |
| 2001/0017985 A1 * | 8/2001 | Tsuboi et al. ............... 396/506 |
| 2002/0024688 A1 * | 2/2002 | Ogasawara et al. ........... 359/16 |
| 2008/0095498 A1 | 4/2008 | Kuiper et al. |

FOREIGN PATENT DOCUMENTS

| | | |
|---|---|---|
| EP | 01204786.6 | 5/2002 |
| WO | WO0034949 | 6/2000 |
| WO | WO0124174 | 4/2001 |
| WO | WO0173775 | 10/2001 |
| WO | WO03049095 | 6/2003 |
| WO | WO03069380 | 8/2003 |

OTHER PUBLICATIONS

Patent Abstracts of Japan, vol. 2003, No. 12, Dec. 5, 2003 -& JP 2003263779 A (Sony Corp), Sep. 19, 2003, abstract, paragraph '0009-paragraph '0040, figures 2,3,5.

Patent Abstracts of Japan, vol. 2000, No. 23, Feb. 10, 2001 -& JP 2001174614 A (Asahi Glass Co Ltd ), Jun. 29, 2001, abstract, the whole document.

Patent Abstracts of Japan, vol. 1998, No. 03, Feb. 27, 1998 -& JP 09306013 A (Olympus Optical Co Ltd), Nov. 28, 1997, abstract, the whole document.

* cited by examiner

OPTICAL SCANNING DEVICE

The invention relates to an optical scanning device, and an optical element for use therein, for scanning a multi-layer optical record carrier, such as an optical disk, the device being adapted for scanning a first information layer at a first information layer depth within the record carrier and a second information layer at a second information layer depth within the record carrier. In particular, but not exclusively, the invention relates to an optical scanning device including a compensator arranged to compensate for spherical aberrations generated by different optical path lengths (referred to herein as information layer depths) through which the beam travels in an optical disk to and from different information layers in the disk.

There is a need for the production of optical record carriers of high capacity. Therefore, optical scanning devices using a relatively short wavelength radiation beam, for example a radiation beam of 400 nm, a high numerical aperture (NA) objective lens system, at least 0.7 and for example NA=0.85, and a thin protective cover layer, for example 80 μm thickness, are desirable. Furthermore, the capacity can be increased by providing a dual layer disk. At the wavelength and NA mentioned, a layer separation of at least 20-30 μm is desirable in order to reduce the coherent cross talk to an acceptable level. Without compensating measures, refocusing from one layer to the other results in spherical aberration, generating a wavefront error of 200-300 mλ (rms), which deteriorates the resolution of the optical spot formed.

It is known to adjust mechanically the spacing of the two, or more, lens elements of a compound objective lens, in order to provide spherical aberration compensation. Another method of compensation is by mechanically adjusting the position of a collimator lens with respect to the radiation source, so that the radiation beam impinges on the objective lens as a convergent, or divergent, instead of collimated, beam. Each of these methods compensates spherical aberration generated in the optical system of the scanning device, to cancel out at least approximately that generated in the optical disk being scanned. Accompanying the spherical aberration generation, the objective lens is moved axially, using a focus actuator, to alter its free working distance when refocusing the spot on the layer being switched to.

A further known optical scanning device is described in WO-A-124174, in which a radiation beam is passed through a twisted nematic (TN) liquid crystal cell which selectively rotates the polarisation of incident light by 90°. The beam is then passed, when in a convergent state, through a birefringent plate to produce spherical aberration therein. The birefringent plate produces different amounts of spherical aberration depending on the state of the TN cell, to compensate for the different information layer thicknesses. Accompanying the switching of the TN cell, the objective lens is moved axially, using a focus actuator, to alter its free working distance and to refocus the spot on the layer being switched to.

It is an object of the invention to provide an improved spherical aberration compensation system in an optical scanning device capable of scanning a multi-layer optical record carrier.

In accordance with one aspect of the invention there is provided an optical scanning device for scanning a multi-layer optical record carrier when positioned in a scanning location in the device, the device being adapted for scanning a first information layer at a first information layer depth within the record carrier and a second information layer at a second information layer depth within the record carrier, the device comprising:

a radiation source for generating a radiation beam;

an objective lens, located in an optical path between the radiation source and the scanning location, for converging a radiation beam to a spot on an information layer; and an optical switching arrangement switchable between a first state, in which the device is arranged to scan a said first information layer, and a second state, in which the device is arranged to scan a said second information layer, wherein the optical switching arrangement comprises a compensator arranged to generate a different amount of spherical aberration in a radiation beam when in said first state and when in said second state, characterised in that the compensator is further arranged to generate a different amount of vergence in a radiation beam when in said first state and when in said second state, the different amounts of spherical aberration and vergence being selected such that a free working distance between said objective lens and said optical record carrier remains substantially constant when switching between said first and second states.

According to the invention, the compensator both introduces spherical aberration and changes the vergence of the beam. In preferred embodiments the vergence change is such that no refocusing is needed of the objective lens, while the amount of spherical aberration produced by the compensator is such that the amount of spherical aberration generated by the compensator and by the objective lens due to the vergence change of the beam compensates the amount of spherical aberration generated by the cover layer change. The amount of spherical aberration produced by the compensator is preferably at least 10 mλ and more preferably at least 30 mλ.

The required vergence change of the beam follows from paraxial calculations. The amount of spherical aberration generated by the objective lens is then known. The remaining required amount of spherical aberration produced by the compensator can thus be determined accordingly.

Spherical aberration compensation may thus be provided for information layers at various depths within an optical disk without the need for movement of the objective lens when switching between the information layers. Hence, the range of movement (the "stroke") of the objective lens can be reduced so that a less complex objective lens actuation arrangement may be used. Furthermore, power requirements can be reduced as corresponding to the reduction in movement of the objective lens during switching between layers.

By way of explanation, the present invention is now contrasted with the two conventional methods used to switch between information layers. Here we consider by way of example the objective lens described in U.S. Pat. No. 6,510,011 (column 8), used with a dual-layer disk having a cover layer which is 0.07 mm thick and having a separation (Δd) between the layers of 0.03 mm.

One known spherical aberration compensation method is to change the conjugate distance of the object. By changing the object distance, the vergence of the beam entering the objective changes. Due to this vergence change the objective lens generates an additional amount of spherical aberration. At a certain vergence the amount of spherical aberration is just enough to compensate for the spherical aberration generated by the difference in cover layer thickness. For the above lens this occurs for conjugate distance L=+88.9 mm (the "positive" conjugate distance means that the beam entering the objective is converging). In order that the spot is in focus on the new layer the objective lens is moved over a distance of 0.0027 mm. Hence the free working distance, being the distance between the rear face of the objective and the front face of the disk, is increased by moving the objective lens to produce a change in free working distance Δfwd. Note that:

$$\frac{\Delta fwd}{\Delta d} = \frac{2.7}{30} = 0.09$$

Hence the axial movement of the objective lens is 9% of the cover layer thickness change.

A further known method is to add spherical aberration by a wavefront modifier as described in WO-A-124174 referenced above. In this case a wavefront modifier in front of the objective introduces directly an amount of spherical aberration while keeping the vergence of the beam substantially unaltered. In this case the lens has to be moved over a distance of 0.0205 mm. Hence the free working distance has to be increased. Note that:

$$\frac{\Delta fwd}{\Delta d} = \frac{20.5}{30} = 0.68$$

Hence the axial movement of the objective lens is 68% of the cover layer thickness change.

In the present invention the optical switching arrangement is designed such that it introduces a vergence change of the beam and introduces spherical aberration such that the free working distance, and hence the axial position of the objective lens, remains substantially constant when switching from the first layer to the second layer. The change in free working distance Δfwd is preferably less than 5% of the thickness change of cover layer Δd. In a more preferred case Δfwd is less than 1% and in an even more preferred case this less than 0.5%.

Furthermore, the focal tolerance Δz (the distance the objective can be moved while the spot on the disk remains diffraction limited) (see Born and Wolf, Principles of Optics, p441) is defined as:

$$\Delta z = 0.5 \frac{\lambda}{NA^2} \quad (1)$$

where λ is the wavelength of the beam and NA the numerical aperture of the objective lens. The change in free working distance should preferably be smaller than ΔZ, hence $$\Delta fwd < \Delta z \quad (2)$$

According to a further aspect of the invention, there is provided a method comprising reading data from the record carrier during a scanning operation conducted on one information layer, and altering the optical characteristics of the optical switching arrangement in order to compensate for a wavefront aberration generated in the record carrier when conducting a subsequent scanning operation, for example a write operation, on the other layer.

According to a further aspect of the invention, there is provided a method comprising writing data to the record carrier during a scanning operation conducted on one information layer, and altering the optical characteristics of the optical switching arrangement in order to compensate for a wavefront aberration generated in the record carrier when conducting a subsequent scanning operation, for example a read operation, on the other information layer.

Thus, the method may be applied for example when switching between layers to conduct alternate read and write operations, as may be performed in an optical scanning device in the form of a video recorder capable of conducting time-lapse recording and playback simultaneously.

Further aspects, features and advantages of various embodiments of the invention will become apparent from the following description, given by way of example only, of preferred embodiments of the invention, referring to the accompanying drawings, wherein:

FIG. 1 is a schematic illustration of components common to a device, in accordance with each of the embodiments of the invention described by way of example below, for scanning an optical record carrier. The record carrier is for example an optical disk as will be described, by way of example, below.

Figure 1:
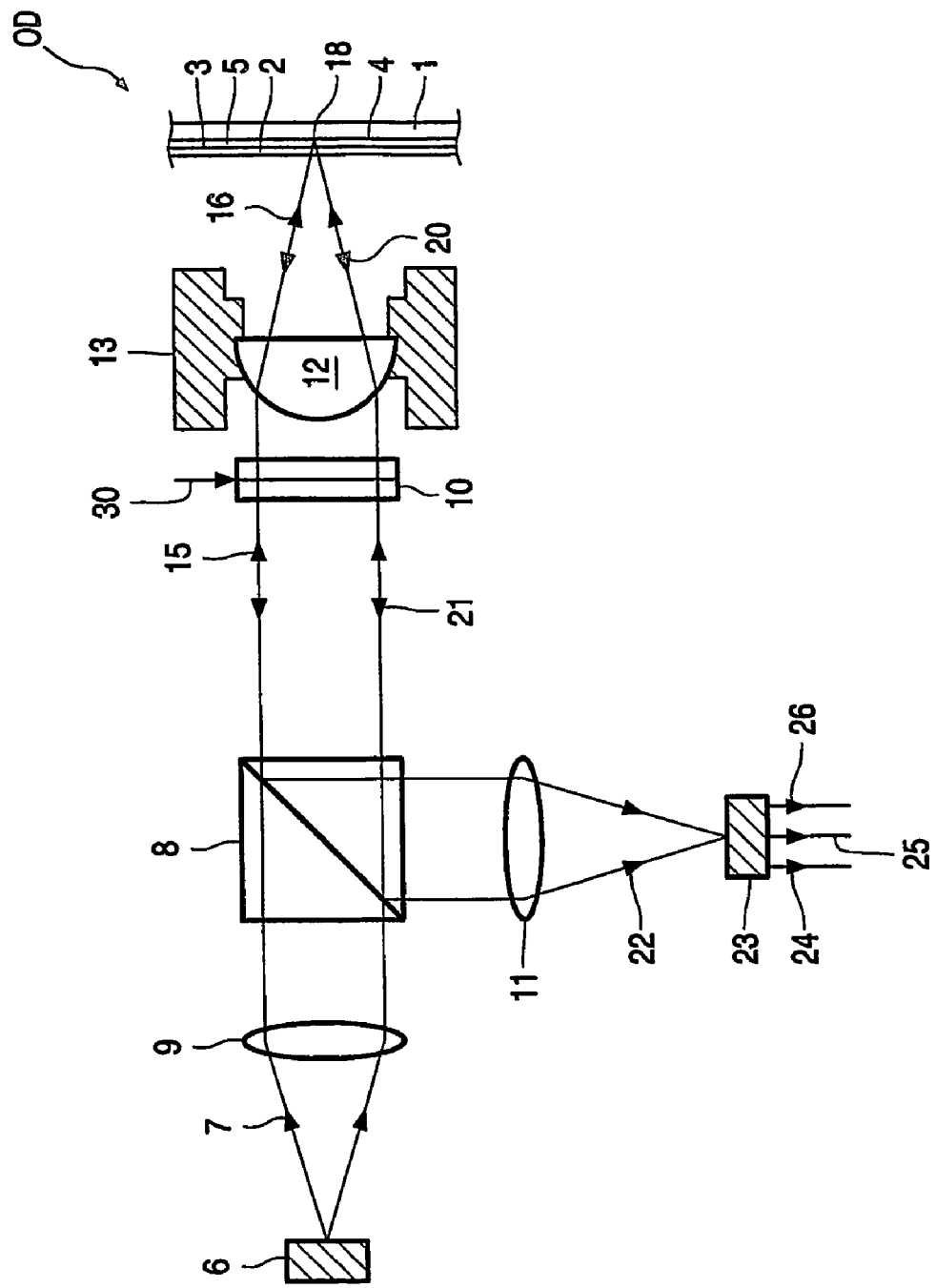
FIG. 1 is a schematic illustration of an optical scanning device arranged in accordance with embodiments of the invention.

The optical disk OD comprises a substrate 1 and a transparent layer 2, behind which two information layers 3, 4 are arranged behind the transparent layer 2, at different depths within the disk, separated by 30 μm (±10 μm). A further transparent layer 5 separates the two information layers. The transparent layer 2, having a thickness of approximate 70 μm (±30 μm), has the function of protecting the uppermost information layer 3, while the mechanical support is provided by the substrate 1.

Information may be stored in the information layers 3, 4 of the optical disk in the form of optically detectable marks arranged in substantially parallel, concentric or spiral tracks, not indicated in FIG. 1. The marks may be in any optically readable form, e.g. in the form of pits, or areas with a reflection coefficient or a direction of magnetization different from their surroundings, or a combination of these forms.

The scanning device includes an optical pickup unit (OPU) mounted on a radially-movable arm. The OPU includes all components illustrated in FIG. 1, other than the disk OD. A radiation source 6, for example a single semi-conductor laser, emits a diverging radiation beam 7 with a wavelength of 400 nm (±10 nm). A beam splitter 8, in this example a polarising beam splitter, reflects the radiation within a lens system. The lens system includes a collimator lens 9, an objective lens 12 and a condenser lens 11. The objective lens 12 is rigidly mounted on a movable mounting 13 held within mechanical actuators (not shown) for performing radial tracking servo and focus servo adjustment of the position of the objective lens 12. The device also includes an optical switching arrangement including a compensator 10, in this embodiment a switchable fluid cell, to be discussed in further detail below.

The collimator lens 9 refracts the diverging radiation beam 7 to form a collimated beam 15. By collimated, we intend to mean a substantially parallel beam, for which the compound objective lens has a transverse magnification substantially equal to zero.

The objective lens 12 transforms the collimated radiation beam 15 into a converging beam 16 having a high numerical aperture (NA), in this example 0.85, which comes to a spot 18 on the information layer, 3 or 4, being scanned. Note that, although the objective lens is shown as a single lens 12, it may be a compound lens including two or more lens elements.

Radiation of the converging beam 16 reflected by the information layer 3 or 4 forms a diverging reflected beam 20, which returns along the optical path of the forward converging beam. The objective lens 12 transforms the reflected beam 20 to a substantially collimated reflected beam 21, and the beam splitter 8 separates the forward and reflected beams by transmitting at least part of the reflected beam 21 towards the condenser lens 11.

The condenser lens 11 transforms the incident beam into a convergent reflected beam 22 focused on detection systems, generally indicated by a single element 23 although a plurality of detector elements are used. The detection systems capture the radiation and convert it into electrical signals. One of these signals is an information signal 24, the value of which represents the information read from the information layer being scanned. Another signal is a focus error signal 25, the value of which represents the axial difference in height between the spot 18 and the respective information layer 3, 4 being scanned. Another signal is a tracking error signal 26, the value of which represents a radial deviation of the spot from the track being scanned. Each of the signals 25, 26 are input to the focus servo and tracking servo mechanical actuators controlling the position of mounting 13 during scanning.

Another signal input into the compensator 10 is a layer switching signal 30. The layer switching signal 30 represents the selected information layer 3 or 4 in the optical disk currently being scanned.

Figure 2:
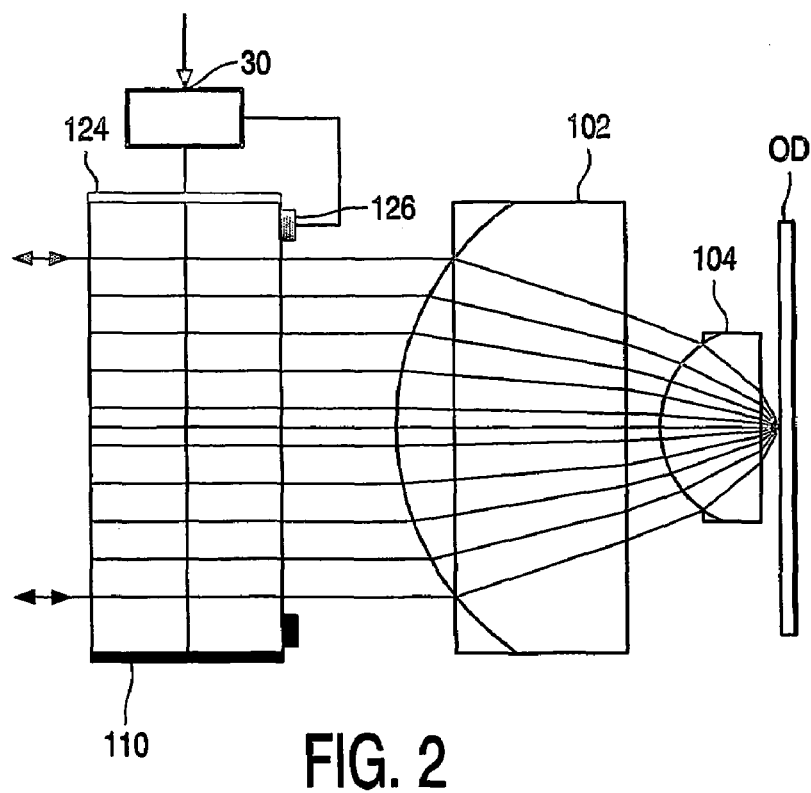
FIGS. 2 and 3 are schematic illustrations of optical components used in an arrangement similar to FIG. 1.
Figure 3:
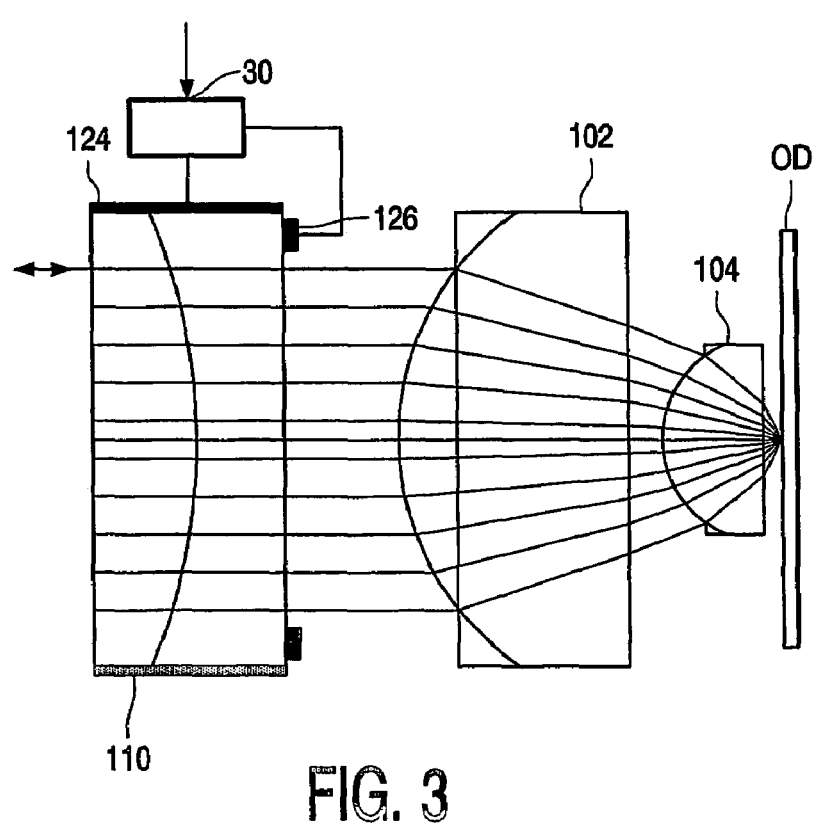

FIGS. 2 and 3 show elements from an optical scanning device arranged similar to the arrangement shown in FIG. 1. In this embodiment the device is for recording and/or playback from a dual-layer optical disk OD, for example a dual-layer Blu-ray™ disk (see for instance the article by K. Schep, B.Stek, R van Woudenberg, M. Blum, S. Kobayashi, T. Narahara, T. Yamagami, H. Ogawa, "Format description and evaluation of the 22.5 GB DVR disc", Technical Digest, ISOM 2000, Chitose, Japan, Sep. 5-8, 2000). The device includes a compound objective lens, for instance having a numerical aperture of 0.85, including a rigid front lens 102 and a rigid rear lens 104, for instance as described in International patent application WO 01/73775, for focusing the incoming collimated beam, for instance having a wavelength of 405 nm, consisting of substantially parallel rays, to a spot in the plane of an information layer currently being scanned.

The two information layers are in this embodiment at depths of 0.1 mm and 0.08 mm; they are thus separated by $\Delta d=0.02$ mm. When refocusing from one layer to the other, due to the difference in information layer depth, some 200 m$\lambda$ of unwanted spherical wavefront aberration arises, which needs to be compensated.

Since the disc and the objective lens remains at the same position the focus position of the beam leaving the objective lens must change by an amount $\Delta l$ which is given by:

$$\Delta l = \frac{\Delta d}{n} \quad (3)$$

where $\Delta d$ is the change in cover layer thickness and n the refractive index of the cover layer. In the case of polycarbonate, the refractive index n=1.622. The change in the vergence of the beam follows then from the lens equation. Let F be the focal length of the objective. Let the conjugate distance be infinite for the information layer at an information layer depth 0.1 mm. For switching to the information layer depth of 0.08 mm, the new conjugate distance L in order to remain in focus, using a thin lens approximation, becomes:

$$L = \left(\frac{1}{F+\Delta l} - \frac{1}{F}\right)^{-1} \quad (4)$$

Using the above parameters, L=+250 mm. A positive value for L means that the beam entering the objective is converging while for L negative, it is diverging. From ray-trace calculations it follows that in order to avoid the need for movement of the objective lens when switching to the information layer at 0.08 mm depth, the vergence of the beam is changed such that, at least approximately, L=+235 mm. The amount of spherical aberration produced by such a change in vergence is −243 m$\lambda$ OPDrms. Hence, the spherical aberration is over corrected by the vergence change alone. The compensator thus in this embodiment also produces at least approximately +43 m$\lambda$ OPDrms spherical aberration directly.

In one embodiment, a switchable fluid cell 110 is used as the compensator. The cell 110 includes first and second immiscible fluids separated by a meniscus of variable curvature, the meniscus contacting a cylindrical hydrophobic side wall and having a configuration switched by electrowetting. Such a fluid cell is described in our previous patent application European Patent application No. 02075649.0, the contents of which are incorporated herein by reference. An oil such as polydimethyl (8-12%)-phenylmethylsiloxane copolymer may be used as one fluid, and an electrically conducting salt water solution may be used as the other fluid.

The cell 110 includes a voltage control circuit 122 for applying one of two selected voltages to a cylindrical electrode 124 and an annular electrode 126 respectively in dependence on the information layer currently being scanned. In one state, during the scanning of the layer at a lesser information layer depth, a relatively low selected voltage is applied to produce a spherical meniscus curvature as shown in FIG. 3. In the other state, during the scanning of the layer at a greater information layer depth, a relatively high selected voltage is applied to produce a substantially planar meniscus curvature as shown in FIG. 2.

In one embodiment, the dual layer disk has a cover layer of 0.07 mm and a layer separation $\Delta d$ of 0.03 mm. In this embodiment the liquid shown to the left in FIGS. 2 and 3 is an oil selected to have a refractive index n=1.372. The liquid shown to the right in FIGS. 2 and 3 is water with refractive index n=1.350. For the first layer of the disk of information layer depth 0.1 mm the meniscus is substantially planar as shown in FIG. 2. For the second layer with information layer depth of 0.07 mm, the curvature of the meniscus is −4.283 mm as shown in FIG. 3. Due to the choice of the refractive indices of the two liquids the fluid cell 10 introduces spherical aberration and introduces a vergence change such that the free working remains the same in both cases while the spherical aberration due to the difference in cover layer thickness is compensated.

In one example $\lambda$=400 nm, and NA=0.85, so, using equations (1) and (2) above, $\Delta$fwd<0.27 micron. Thus, in relation to the above embodiment, the change in free working distance ($\Delta$fwd) is preferably less than 0.9% of the change in information layer depth $\Delta d$.

Note that electrowetting switching is almost powerless, thus less power is used that would be used in the prior art arrangements to move the objective lens with the focus actuator.

Further, because of the small vergence change and the small amount of spherical aberration generated by the compensator the decentering tolerance of the element is larger than 100 micron.

The above embodiments are to be understood as illustrative examples of the invention. Further embodiments of the invention are envisaged. In one alternative embodiment, the compensator is provided in the form of a birefringent grating, switched using a polarisation switching arrangement.

In a further embodiment, also using a polarisation switching arrangement, the compensator is provided in the form of a birefringent phase structure with a non-periodic pattern, i.e. one which does not regularly repeat in the radial direction, and, therefore, does not form diffraction orders. As a consequence, the phase structure does not have the inherent losses of a grating. The compensator thus introduces the required wavefront changes without appreciable loss of radiation energy. A switchable optical element including a phase structure with a non-period pattern, which can change the vergence and add spherical aberration, is described in our earlier European patent application no. 01204786.6.

It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. An optical scanning device for scanning a multi-layer optical record carrier when positioned in a scanning location in the device, the device being configured for scanning a first information layer at a first information layer depth within the record carrier and a second information layer at a second information layer depth within the record carrier, the device comprising:
    a radiation source for generating a radiation beam;
    an objective lens, located in an optical path between the radiation source and the scanning location, for converging a radiation beam to a spot on an information layer; and
    an optical switching arrangement switchable between a first state, in which the device is arranged to scan said first information layer, and a second state, in which the device is arranged to scan said second information layer,
    wherein the optical switching arrangement comprises a non-mechanical compensator arranged to generate, without need of a mechanical system, a different amount of spherical aberration in a radiation beam when in said first state and when in said second state,
    wherein the non-mechanical compensator is further arranged to generate a different amount of vergence in a radiation beam when in said first state and when in said second state, the different amounts of spherical aberration and vergence being selected such that a free working distance between said objective lens and said optical record carrier remains substantially constant when switching between said first and second states.

2. An optical scanning device according to claim 1, wherein a change in free working distance (Δfwd) when switching between said first and second states is less than 5% of a difference (Δd) in the first and second information layer depths.

3. An optical scanning device according to claim 2, wherein the change in free working distance (Δfwd) is less than 1% of the difference (Δd) in the first and second information layer depths.

4. An optical scanning device according to claim 1, wherein a change in free working distance (Δfwd) when switching between said first and second states is less than a focal tolerance Δz:

$$\Delta z = 0.5 \frac{\lambda}{NA^2}$$

where λ is the wavelength of the said radiation beam and NA the numerical aperture of the objective lens.

5. An optical scanning device according to claim 1, wherein said non-mechanical compensator comprises a birefringent grating element arranged to provide the different amounts of spherical aberration and vergence.

6. An optical scanning device according to claim 1, wherein said non-mechanical compensator comprises a birefringent phase structure having a non-periodic pattern which does not regularly repeat in a radial direction on the non-mechanical compensator, the phase structure being arranged to provide the different amounts of spherical aberration and vergence.

7. A method of operating the optical scanning device of claim 1, comprising reading data from the record carrier during a scanning operation conducted on one information layer, and altering the optical characteristics of the optical switching arrangement in order to compensate for a wavefront aberration generated in the record carrier when conducting a subsequent scanning operation on the other layer.

8. A method of operating the optical scanning device of claim 1, comprising writing data to the record carrier during a scanning operation conducted on one information layer, and altering the optical characteristics of the optical switching arrangement in order to compensate for a wavefront aberration generated in the record carrier when conducting a subsequent scanning operation on the other information layer.

9. The optical scanning device of claim 1, wherein the non-mechanical compensator is disposed within said optical path.

10. The optical scanning device of claim 1, wherein the non-mechanical compensator comprises an electrically-switchable fluid cell.

11. An optical scanning device for scanning a multilayer optical record carrier when positioned in a scanning location in the device, the device being configured for scanning a first information layer at a first information layer depth within the record carrier and a second information layer at a second information layer depth within the record carrier, the device comprising:
    a radiation source for generating a radiation beam;
    an objective lens, located in an optical path between the radiation source and the scanning location for converging a radiation beam to a spot on an information layer; and
    an optical switching arrangement switchable between a first state, in which the device arranged to scan a said first information layer, and a second state, in which the device is arranged to scan a said second information layer,
    wherein the optical switching arrangement comprises a compensator arranged to generate a different amount of spherical aberration in a radiation beam when in said first state and when in said second state,
    wherein the compensator is further arranged to generate a different amount of vergence in a radiation beam when in said first state and when in said second state, the different amounts of spherical aberration and vergence being selected such that a free working distance between said objective lens and said optical record carrier remains substantially constant when switching between said first and second states, wherein said compensator comprises a set of fluids having a switchable configuration.

12. An optical scanning device according to claim 11, wherein said set of fluids provides a fluid meniscus of which the shape is varied when switching between said first and second states to provide the different amounts of spherical aberration and vergence.

13. A non-mechanical optical element configured for use in an optical scanning device for scanning a multi-layer optical record carrier when positioned in a scanning location in the device, the device being configured for scanning a first information layer at a first information layer depth within the record carrier and a second information layer at a second information layer depth within the record carrier, the device comprising:

a radiation source for generating a radiation beam;

an objective lens, located in an optical path between the radiation source and the scanning location, for converging a radiation beam to a spot on an information layer; and an optical switching arrangement switchable between a first state, in which the device is arranged to scan said first information layer, and a second state, in which the device is arranged to scan said second information layer, wherein the non-mechanical optical element is included in said switching arrangement and is configured to generate, without need of a mechanical system, a different amount of spherical aberration in a radiation beam when the optical switching arrangement is in said first state and when in said second state, wherein the non-mechanical optical element is configured to generate a different amount of vergence in a radiation beam when in said first state and when in said second state, the different amounts of spherical aberration and vergence being selected such that a free working distance between said objective lens and said optical record carrier remains substantially constant when switching between said first and second states.

14. The non-mechanical optical element of claim 13, wherein the non-mechanical optical element is disposed within said optical path.

15. The non-mechanical optical element of claim 13, wherein the non-mechanical optical element comprises an electrically-switchable fluid cell.

* * * * *